(12) United States Patent
Ribeiro et al.

(10) Patent No.: US 9,517,490 B2
(45) Date of Patent: Dec. 13, 2016

(54) UV IRRADIATION DEVICE FOR CLOCKED OPERATION

(71) Applicant: Oerlikon Surface Solutions AG, Trübbach, Trübbach (CH)

(72) Inventors: Carlos Ribeiro, Ho Chi Minh (VN); Tasso Karsch, Waiblingen (DE); Rüdiger Schäfer, Grafenhausen (DE); Martin Kaspar, Mels (CH)

(73) Assignee: OERLIKON SURFACE SOLUTIONS AG, PFAFFIKON, Pfaffikon Sz (CH)

( * ) Notice: Subject to any disclaimer, the term of this patent is extended or adjusted under 35 U.S.C. 154(b) by 0 days.

(21) Appl. No.: 14/437,934

(22) PCT Filed: Oct. 22, 2013

(86) PCT No.: PCT/EP2013/003176
§ 371 (c)(1),
(2) Date: Aug. 26, 2015

(87) PCT Pub. No.: WO2014/063809
PCT Pub. Date: May 1, 2014

(65) Prior Publication Data
US 2015/0375263 A1      Dec. 31, 2015

(30) Foreign Application Priority Data

Oct. 23, 2012    (DE) .................. 10 2012 020 743

(51) Int. Cl.
*H01J 37/00*        (2006.01)
*B05D 3/06*         (2006.01)
(Continued)

(52) U.S. Cl.
CPC ............. *B05D 3/067* (2013.01); *F26B 3/28* (2013.01); *G02B 5/208* (2013.01); *G02B 5/283* (2013.01)

(58) Field of Classification Search
None
See application file for complete search history.

(56) References Cited

U.S. PATENT DOCUMENTS 4,149,086 A * 4/1979 Nath .................. A61C 19/004
                                                   250/493.1
4,644,899 A * 2/1987 Glaus ...................... B05D 3/06
                                                    118/642
(Continued)

FOREIGN PATENT DOCUMENTS

DE       35 29 800 A1      3/1986
FR       2 341 815 A1      9/1977
WO       98/54525 A1      12/1998

OTHER PUBLICATIONS

International Search Report issued in Application No. PCT/EP2013/003176 dated Jan. 21, 2014.

*Primary Examiner* — Andrew Smyth
(74) *Attorney, Agent, or Firm* — Pearne & Gordon LLP

(57) ABSTRACT

An irradiation device including at least one radiation source, which emits both UV-radiation and W-radiation, i.e. visible light and/or IR radiation. The device includes a transport device for delivering substrates to be irradiated. At least one wavelength-selective filter reflects UV-radiation at an angle of 45° and transmits W-radiation. Means for the absorption of IR radiation are arranged downstream of the optical filter in the propagation direction in the beam path of the W-radiation not deflected by the wavelength-selective filter. The means for the absorption of IR radiation are also designed to absorb visible light and UV rays, and the irradiation device includes movement means in order to guide the wavelength-selective filter into and out of the beam path of the radiation source.

9 Claims, 2 Drawing Sheets

(51) Int. Cl.
    *F26B 3/28*     (2006.01)
    *G02B 5/20*     (2006.01)
    *G02B 5/28*     (2006.01)

(56) References Cited

U.S. PATENT DOCUMENTS

| | | | | |
|---|---|---|---|---|
| 4,864,145 | A * | 9/1989 | Burgio, Jr. | B41F 23/0409 250/492.1 |
| 5,595,118 | A * | 1/1997 | Villaverde, Sr. | B41F 23/04 101/424.1 |
| 5,695,561 | A * | 12/1997 | Tomiyama | B05D 3/067 118/620 |
| 5,782,895 | A * | 7/1998 | Zarate | A61N 5/062 250/504 R |
| 5,932,886 | A * | 8/1999 | Arai | B01J 19/123 250/492.1 |
| 6,621,087 | B1 * | 9/2003 | Bisges | F21V 7/005 250/492.1 |
| 6,834,984 | B2 * | 12/2004 | Tausch | H01R 33/0854 250/503.1 |
| 6,883,936 | B2 * | 4/2005 | Register | H01R 33/0854 250/504 R |
| 7,692,170 | B2 * | 4/2010 | Gaus | B41F 23/0409 118/620 |
| 9,157,642 | B2 * | 10/2015 | Maeng | A61L 9/20 |
| 2002/0030882 | A1 * | 3/2002 | Vitt | C03C 17/3417 359/350 |
| 2005/0225999 | A1 * | 10/2005 | Bucher | F21S 48/145 362/539 |

* cited by examiner

UV IRRADIATION DEVICE FOR CLOCKED OPERATION

The present invention is directed to a method for UV cross-linking of lacquer-layers according to the generic part of claim 1. The invention further addresses an irradiation apparatus for operating the method.

By means of UV cross-linking lacquers, which are applied upon substrates, are hardened and dried. The lacquer remains flowable up to the cross-linking and may be abruptly solidified after having being applied on a substrate.

As a UV-radiation source mostly a radiation source is used, which emits UV-radiation as well as visible light as well as a high percentage of infrared radiation (IR-radiation). The high portion of IR-radiation leads to high process temperatures, which may harm the substrates to be irritated. Especially, if the lacquered substrates are plastic-material substrates, in case of application of customarily radiation, critical temperatures are reached frequently. As an example for plastic material, known under the name ABS, temperatures of 85° should not be exceeded.

According to the DE 3529800 this problem is resolved in that the rays of the UV-radiation source are led via a ray-selecting mirror to the substrate such that the substrate is exclusively exposed to deflected UV-rays, whereby the heat richer IR part of the rays passes through the mirror straight-lined. FIG. 1 from DE 3529800 shows the respective prior art where the UV-radiation source 2, a reflector 4, a mirror 6 pivotably mounted about a pivot axis 8, and the substrate 10 are shown. The mirror 6 is arranged at an angle of 45° to an optical axis 12. The rays A impinge on the mirror 6. Behind the mirror 6 and within the ray course of the heat richer IR part B of the rays, which have passed through the mirror 6, there is applied a cooling arrangement. Such may be realized as an example by cooling fins 14, which are part of the wall of the casing 16. UV-rays C are deflected by the mirror 6 on to the substrate 10.

The DE 3529800 addresses also the problem that whenever there occurs an operation shut-down, the radiation source should, if possible, not be switched-off. Thereby, the mirror is, if arranged in an angle of 45° to the optical axis of the ray-beam, realized to be swivable by 90° so that the UV-radiation may be simply and quickly diverted in case of a shut-down of operation. The UV-radiation rich ray-beam is thereby diverted by 180°, so as to impinge on the casing wall of the irradiation apparatus.

Nevertheless, this has the drawback that the mirror must be realized in a specific manner. The mirror may either be provided on one side or on both sides with a UV reflecting layer. Is there provided on both sides of the substrate a UV reflecting layer, one must consider that by this layer always a part of the visible light and/or of the IR-radiation is reflected. This is especially true in case of the radiation impinges on the mirror surface in different impinging angles. Having a double sided UV reflection layer, the part of the non-UV-rays is thus increased, which unwantedly is reflected into the ray-path of UV light and impinges onto the substrate.

If only on one side of the mirror substrate a UV reflecting layer is applied, then on the other side, an anti-reflection layer for visible light and for IR-radiation should be selected across a wide impinging angle range. In this case, a special material which does substantially not absorb UV-radiation, should be selected as mirror substrate material. Otherwise, due to double penetrating of the substrate, excessive UV-radiation would be absorbed and the mirror could be damaged. It is probably also due to this reason that in the DE 3529800 the radiation source is preferably operated on half power. Such UV-radiation non-absorbing materials, as e.g. quartz glass, are nevertheless expensive. This is especially relevant for large apparatuses.

It is an object of the present invention to provide an apparatus, by which the problems of the prior art as addressed above are at least reduced and are preferably completely removed.

According to the invention, the object is resolved in that, departing from a irradiation apparatus as shown in FIG. 1, the cooling arrangement 6 is additionally tailored as a UV-radiation absorbing arrangement. According to the invention, the mirror is removed out of the ray-path of the radiation, if the UV-irradiation of the substrates is to be interrupted. This may be realized e.g. by rotation of the mirror with respect to an axis, which is located outside the ray-path of the radiation.

It is also possible to turn the mirror in this way that only the edges of the mirror substrate is irradiated by the radiation or the radiation impinges on the substrate surface at a very large impinging angle and is reflected to a major part but is hardly deflected due to the large impinging angle.

The mirror substrate may now be made of a UV-radiation absorbing material and it is also possible to apply only on one side of the mirror substrate a UV reflecting coating and, preferably, to provide on the other side of the mirror substrate an anti-reflection layer.

According to a preferred realization form of the present invention, the edges of the mirror substrate are provided with means, which at least to a part, block impinging radiation (being absorbing or reflecting).

According to a further preferred form of realization substrates to be subjected to the radiation are fed to the irradiation apparatus by means of a transport arrangement in a clocked manner. It is thereby especially advantageous, if, during the feeding step, the UV-irradiation of the area, in which the substrates are positioned for irradiation, is interrupted. This may be realized clocked, as well, and preferably synchronized with the addressed feeding by swiveling of the mirror.

According to a further form of realization of the present invention, the mirror is subjected to an oscillating movement during UV-irradiation, whereby a homogenous irradiation of the substrates is achieved.

The invention shall now be further explained by means of an example.

Figure 1:
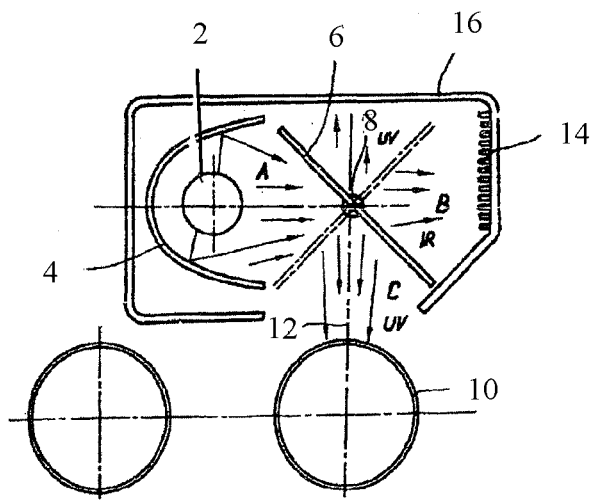
FIG. 1 shows an irradiation apparatus according to prior art.
Figure 2:
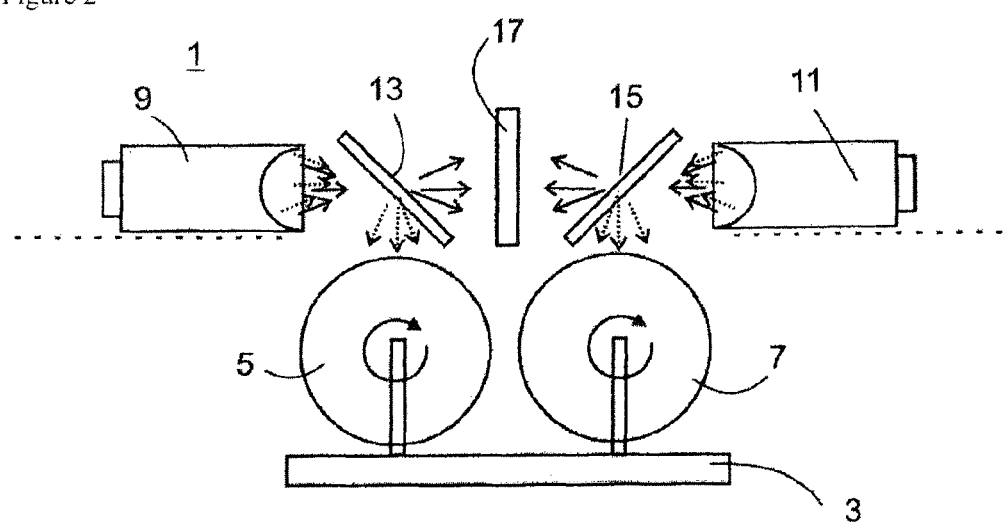
FIG. 2 shows an irradiation apparatus according to the present invention in the substrate-irradiating mode.

In FIG. 2 there is shown an irradiation apparatus 1 according to the invention with a transport arrangement 3, the carrier thereof being realized by a double spindle carrier. On spindles 5, 7 the substrates to be cured are provided, which nevertheless are not shown here for clearness sake. The irradiation apparatus 1 comprises in this example two radiation sources 9, 11 which generate UV-radiation (arrows with dashed lines) as well as visible light and IR-radiation. In the following, visible light and IR-radiation are commonly addressed as heat-rich radiation (W-radiation) (shown by arrows in solid lines). The radiation sources 9, 11 are, in the example, oriented such that their un-deflected rays cross each other in a single plane. In this crossing plane, an absorber plate 17 is provided, which absorbs the UV-radiation and the W-radiation. Preferably, the two radiation sources 9, 11 are oriented such that they would mutually irradiate each other by their radiation, assuming that the absorber plate is not present.

Within the ray-paths from the radiation sources to the absorber plate, there is respectively provided a wave-length selective mirror 13, 15. The mirrors are tilted by 45° with respect to the optical axis of the radiation sources so that the radiation is reflected by 90° with respect to the original ray-path. The mirrors 13,15 reflect the UV-radiation and transmit to a substantial part and preferably to a predominant part the W-radiation. Such mirrors may e.g. be realized by means of optical interference filters. It is especially advantageous to provide on one side of the mirror substrate, which can comprise a customarily BK7 glass, the UV-reflector and the W-radiation transmitter and to provide on the other side a broad-band anti-reflex coating. Both may be realized by means of thin multilayers, which show interference.

Spindles 5, 7 are fed into the ray-paths of the UV-radiation being deflected by 90°. Thus, during switched-on radiation sources 9, 11, the W-radiation is not deflected and is transmitted through the mirrors 13, 15 to the absorber plate. In opposition thereto, the UV-radiation is led onto the substrates, which are arranged on the spindles, by reflection at the mirrors. The spindles are commonly realized as rotatable spindles so that they may rotate the respective substrates into the respective impinging areas during UV-irradiation. In the example, the mirrors 13,15 are oscillated with a small amplitude (e.g. 1°) about an axis, which is different from a normal on the mirror surface and which lays in the plane defined by the optical axes of the reflected radiation and of the un-deflected radiation. Thereby, the homogeneity of UV-irradiation is increased.

Figure 3:
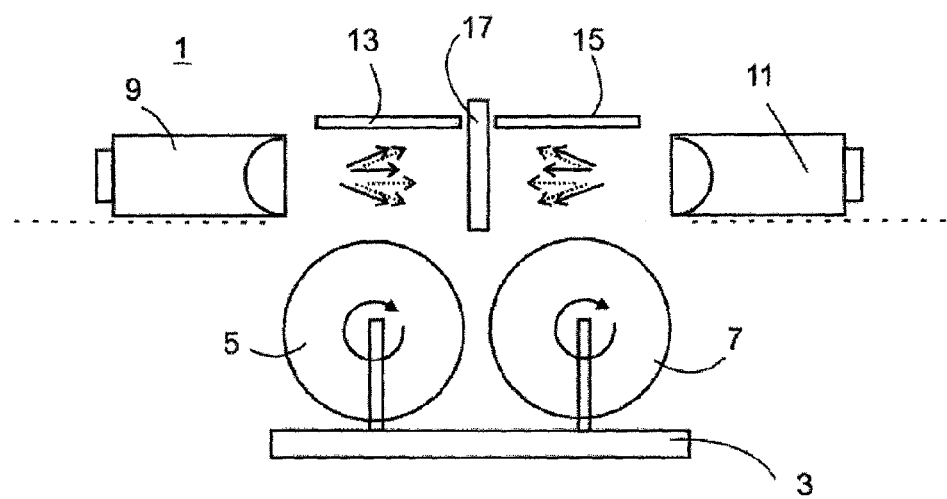
FIG. 3 shows an irradiation apparatus according to the invention in the feeding mode.

In order to terminate UV-irradiation, the mirrors 13, 15 are swiveled to an orientation, in which the optical axis of the un-deflected radiation is parallel to the mirror surface. This is preferably realized about an axis, which is located outside the ray-path of the undisturbed radiation source. In this way, the predominant part of the UV-radiation propagates as well un-deflected towards the absorber plate and is absorbed there. The respective situation is shown in FIG. 3. In this situation, the spindles, which have already been UV-irradiated, may be removed by the transport arrangement and new spindles still to be irradiated, may be conveyed into the irradiation area. By means of back swiveling the mirrors into the original orientation, a new irradiation sequence starts.

By means of a preferred form of realization of the present invention, there has been disclosed a irradiation apparatus, comprising
 at least one radiation source, which emits UV-radiation as well as W-radiation, i.e. visible light and/or IR-radiation, and
 a transport arrangement for feeding substrates to be irradiated, and
 at least one wave-length selective filter, which reflects the UV-radiation and transmits W-radiation about an angle of 45°,
 means for absorbing IR-radiation located downstream of the optical filter, as considered in direction of propagation, in the ray-path of the W-radiation, not deflected by the wave-length selective filter, whereby the
irradiation apparatus is characterized by the facts that the means for absorbing of IR-radiation are also tailored as means absorbing visible light and UV-radiation and that the irradiation apparatus comprises moving means for moving the wave-length selective filter into and out of the ray-path of the radiation source.

The moving means may be realized so that they allow a rotation of the filter about an axis, which is situated outside the ray-path.

The wave-length selective filter may be realized as an interference filter. As an example, there may be provided only on one side of the filter substrate a UV reflecting layer system, and on the other side of the filter substrate there may be provided an anti-reflex layer for W-radiation.

There was disclosed a method for irradiating substrates by UV-radiation, which comprises the steps of:
 Providing a radiation source, which emits UV-radiation and W-radiation,
 Separation of the UV-radiation from the W-radiation by means of transmission of the W-radiation through a wave-length selective filter and reflection of the UV-radiation at the wave-length selective filter,
 Providing absorption means, which absorb radiation not deflected by the wave-length selective filter,
 Feeding the substrates into the area provided for the UV-irradiation,
 Removal of the substrate having been irradiated by the UV-radiation,
whereby, before the feeding and/or the addressed removal of the substrates, the wave-length selective filter is changed with respect to its local orientation and/or position in a manner that during the feeding and/or the removal of the substrates, the UV-radiation is not reflected by the wave selective filter and thus impinges on the absorption means and is absorbed by these means.

By this method, the filter is substantially removed from the ray-path during the addressed feeding and/or removal of the substrates.

The filter may be moved out of the ray-path by rotation about an axis, which is located outside the addressed ray-path. The method may be performed more than one time and in a clocked manner.

What is claimed is:

1. Irradiation apparatus with
 at least one radiation source, which emits UV-radiation as well as W-radiation, i.e. visible light and/or IR-radiation and,
 a transport arrangement for feeding substrates to be irradiated, and
 at least one wave-length selective filter, which reflects the UV-radiation and transmits W-radiation about an angle of 45°,
 means for absorbing of IR-radiation, located downstream of the optical filter, as considered in direction of propagation, in the ray-path of the W-radiation, not deflected by the wave-length selective filter,
 characterized by that the means for absorbing of IR-radiation are also tailored as means absorbing visible light and a predominant part of UV-radiation, and that the irradiation apparatus comprises moving means for moving the wave-length selective filter into and completely out of the ray-path of the radiation source.

2. Irradiation apparatus according to claim 1, characterized by that the moving means allow for a rotation of the filter about an axis, which is located outside the ray-path.

3. Irradiation apparatus according to claim 1, characterized by that the wave-length selective filter is tailored as an interference filter.

4. Irradiation apparatus according to claim 1, characterized by that only on one side of the filter substrate a UV reflecting layer system is provided.

5. Irradiation apparatus according to claim 4, characterized by that there is applied on the other side of the filter substrate an anti-reflex layer for the W-radiation.

6. A method for irradiating substrates by UV-radiation, comprising the steps of:
   providing a radiation source, which emits UV-radiation and W-radiation,
   separation of the UV-radiation from the W-radiation by means of transmission of the W-radiation through a wave-length selective filter and reflection of UV-radiation at the wave-length selective filter,
   providing absorption means, which absorb radiation not deflected by the wave-length selective filter,
   feeding the substrates into the area provided for the UV-irradiation,
   removal of the substrates having been irradiated by the UV-radiation,
   characterized by that, before the feeding and/or the removal of the substrates, the wave-length selective filter is changed with respect to its local orientation and/or position in a manner that during the feeding and/or the removal of the substrates, the UV-radiation is not reflected by the wave-length selective filter and thus impinges on the absorption means and is absorbed by these means.

7. The method according to claim 6, characterized by that the filter is substantially moved out of the ray-path during the feeding and/or the removal of the substrates.

8. The method of claim 7, characterized by that the filter is moved out of the ray-path by a rotation about an axis located outside the ray-path.

9. The method according to claim 6, characterized by that the method is operated more than once and in a clocked manner.

* * * * *